April 1, 1958
L. J. LARSEN
2,828,641
POWER STEERING DEVICE
Filed May 2, 1956
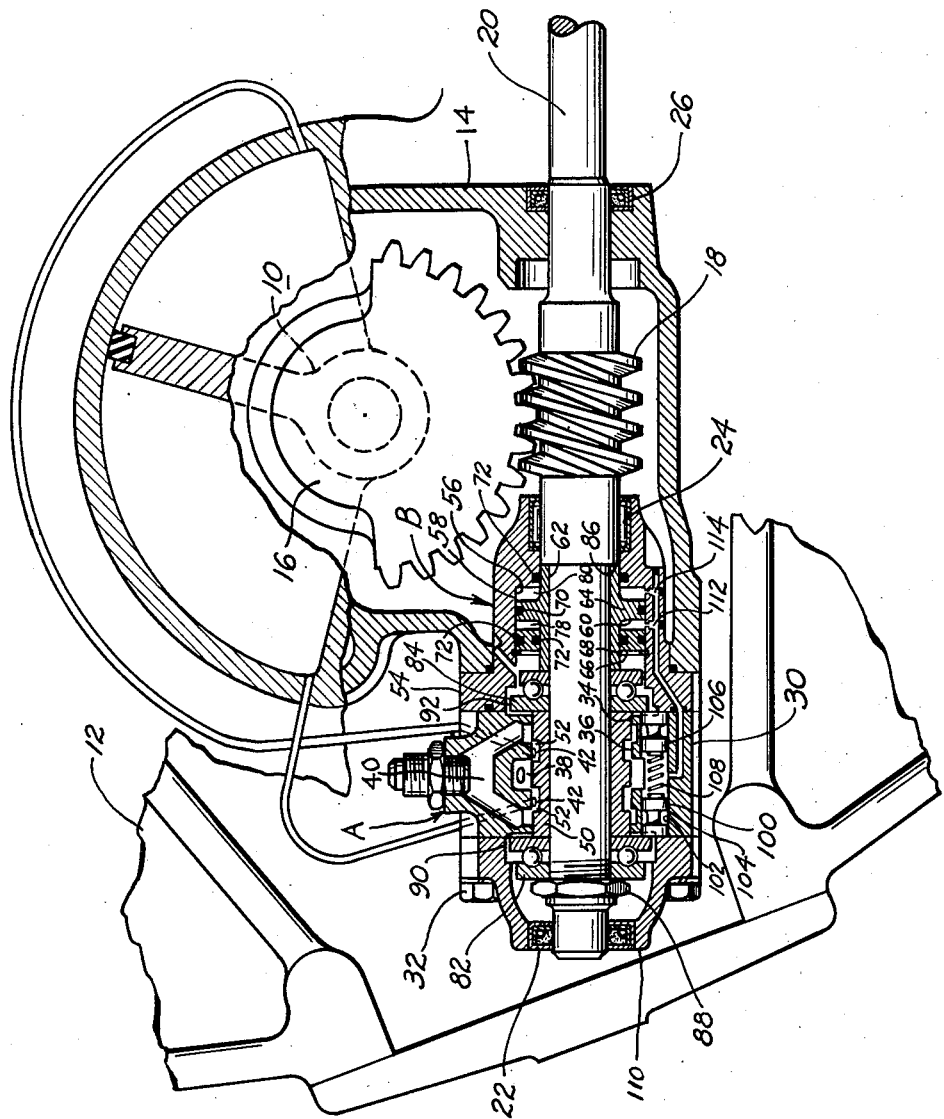
INVENTOR.
LESTER J. LARSEN.
BY
*William P. Hickey*
ATTORNEY.

United States Patent Office 2,828,641
Patented Apr. 1, 1958

2,828,641

POWER STEERING DEVICE

Lester J. Larsen, St. Joseph, Mich., assignor to Bendix Aviation Corporation, South Bend, Ind., a corporation of Delaware Application May 2, 1956, Serial No. 582,092

6 Claims. (Cl. 74—388)

The present invention relates to power steering equipment; and more particularly to power steering equipment having hydraulic fluid pressure servo-motors and controls.

An object of the present invention is the provision of a new and improved power steering system of the type having a servo-motor operatively connected and controlled by a hydraulic control valve, and in which hydraulic dampening means is provided to overcome chatter and instability.

A further object of the invention is the provision of new and improved dampening means for systems of the above described type and comprising a hydraulic fluid pressure motor having a pair of opposing chambers separated by a movable wall, and passage means connecting a supply of hydraulic fluid to each of the opposing chambers, said passage means having a pair of branch connections the individual ones of which communicate with individual ones of the opposing chamber, and each of which branch connections are provided with a flow restricting orifice.

An additional object of the invention is the provision of new and improved dampening means of the above described type in which said passage means communicates with a source of fluid supply whose pressure is appreciably above atmospheric, thereby maintaining said opposing chambers under pressure.

The invention resides in certain constructions and combinations and arrangements of parts and further objects and advantages will be apparent to those skilled in the art from the following description of the preferred embodiment described with reference to the accompanying drawing forming a part of this specification and in which:

The single figure of the drawing is a fragmentary cross-sectional view of a power steering system embodying the principles of the present invention.

Referring to the drawing, there is shown therein a power steering system of the type which may be operated manually and which includes a power assist device controlled by means of lost motion provided in the manual steering system. The device shown in the drawing is intended to be utilized in farm tractors and the like in which the front wheels of the tractor are mounted on the lower end of a vertical shaft 10 journalled in the casting 12 mounted on the tractor. The upper end of the vertical shaft 10 extends into a gear housing 14 and is provided with a segmental gear 16 which is in mesh with a worm gear 18 carried by the steering shaft 20 of the tractor. The lower end of the steering shaft is rotatably journalled in the gear housing 14 by means of bearings 22, 24 and 26 and is otherwise constructed to accommodate a limited amount of axial movement. Power assist is provided for the device, shown in the drawing, by means of a rotary sliding vane type hydraulic fluid pressure motor positioned in the casting 12 intermediate the wheels of the tractor and the gear housing 14, and the rotor of which is directly connected to the vertical shaft 10.

Operation of the fluid pressure servo motor or power assist device is controlled by a slide valve generally indicated at A positioned about the shaft 20 and receiving its operative movement from the above described limited axial movement of the shaft 20.

The control valve A comprises a valve body 30 fastened to the gear housing 14 by machine screws 32 and having an axially extending cylindrical chamber positioned concentrically to the steering shaft 20. The side walls 36 of the cylindrical chamber 34 are provided with a centrally located fluid pressure port 38, a pair of return ports 40 positioned on opposite sides of pressure port 38, and a pair of motor ports 42 the individual ones of which are positioned intermediate said pressure port 38 and the return ports 40. Suitable passages are provided in the valve body 30 to communicate the motor ports 42 with respective connections on the outside of the valve body 30. Other passages communicate the pressure port 38 with a pressure connection; and still other passages communicate the return ports 40 with a common return connection—all of which connections are located on the outside of the valve body 30. Communication between the above mentioned ports is controlled by a cylindrically shaped or valve member slide 50 carried by the shaft 20 and in substantial sealing engagement with the side walls 36 of the cylindrical chamber 34. The cylindrically shaped valve member 50 is adapted to be moved axially of the cylindrical chamber 34 and is provided with a pair of recesses or grooves 52 having a width slightly greater than the distances between the pressure and return ports, and so positioned relative to the pressure and return ports so as to provide restricted flow communication therebetween when the valve member 50 is centrally located in the chamber 34.

Intermediate the slide valve A and the gear housing 14 is provided a removable section 54 comprising damping means generally indicated as B. The removable section 54 is bored and counterbored to provide an opening through which shaft 20 extends. Bearing 24 is suitably affixed to the inner end of the removable section 54; and the side walls 56 of the counterbore 58 form the cylinder of the damping means B.

The damping means B is of the cylinder and piston type in which the piston 60 is formed from a sleeve 62 positioned about the shaft 20 and provided with a radially extending flange 64. The outer end of the cylinder of the fluid pressure motor is closed off by an annular ring 66 held in place by a snap ring 68. A piston ring 70 is provided on the flange or piston 64 and O-rings 72 are provided on the annular ring 66 and the inner end of the removable section 54 to provide substantially sealed or fluid tight opposing chambers 78 and 80 on opposite sides of the movable wall or piston 64.

The sleeve 62 and the annular valve member 50 are assembled upon a reduced diameter section of the shaft 20 with thrust bearings 82 and 84 being positioned on opposite sides of the valve member 50. The sleeve 62 abuts a shoulder 86 on the inner end of the reduced diameter section of the shaft and the assembly of sleeves and bearings are held onto the shaft by a nut 88 tightened against the outer thrust bearing 82. Recesses 90 and 92 are provided in opposite ends of the valve body 30 to accommodate a predetermined amount of axial movement of the shaft 20 along with the attached valve member 50 and piston 64.

The shaft 20, attached slide 50 and piston 64 are biased axially to a neutral position wherein equal pressure is supplied to the motor ports by a plurality of identical centering devices 100 (only one of which is shown) spaced about the valve body 30. Each of the centering devices 100 comprise a cylindrical bore 102 extending longitudinally through the valve body 30 and are provided with plungers 104 and 106 positioned in opposite ends of the bores. The plungers 104 and 106 are biased apart by a spring 108 positioned intermediate the plungers, and are held in the bore 102 by being confined between the section 54 and a cap 110 bolted to the outer face of the valve body. The bore 102 is so located radially that only the radially outer portion of the plungers 104 and 106 bear against the cap 110 and section 54 respectively, while the radially inner portion of the plungers is positioned to bear against the thrust bearings 82 and 84 respectively. Axial forces on the shaft 20 therefore forces the appropriate plunger inwardly compressing spring 108; and upon release of these forces, spring 108 causes the valve member 50 to center itself. In addition to the spring action above described, hydraulic pressure is also used to force plungers 104 and 106 apart. The annular inlet or pressure port 38 is arranged to intersect bores 102 and so supply hydraulic inlet pressure to the plungers.

It is a characteristic of hydraulic control valves of the above described type, and particularly when incorporated in tractor steering systems wherein the tires bearing upon the ground create a considerable amount of yieldable counter torque, to oscillate or chatter when the wheels are turned. It is the purpose of the fluid pressure motor B to dampen out these oscillations and accordingly the opposing chambers 78 and 80 are filled with oil, and restricted flow communication is provided therebetween. This is accomplished by a passageway 110 which communicates the pressure port 38 with each of the opposing chambers 78 and 80. Passageway 110 is provided with a pair of branch portions 112 and 114, which communicate with chambers 78 and 80, respectively, and each of which is provided with a flow restricting orifice.

Upon turning the steering wheel of the tractor, worm gear 18 will be caused to turn in segmental gear 16. Rotation of segmental gear 16 is restrained by friction between the tires of the tractor and the ground, and initial rotation of the shaft 20 therefore causes the shaft to shift axially to provide a certain amount of lost motion or movement for operating valve A. Counterclockwise movement of shaft 20 by the operator causes the shaft to be moved forwardly, whereupon valve member 50 moves forwardly to decrease the pressure supplied to the forward motor port—and increase the pressure supplied to the rear motor port. Differential pressure thereby supplied to the power assisting fluid pressure motor causes the motor to turn the segmental gear 16 counterclockwise. When shaft 20 was moved forwardly, thrust bearing 84 moved plunger 106 forwardly compressing spring 108 to provide yieldable resistance or feel to the steering shaft. Upon segmental gear 16 being moved by the power assisting motor, worm gear 18 will tend to be moved rearwardly by the springs 108 and inlet pressure against the plungers 104 and 106. The amount of axial movement of the shaft 20 varies with the speed at which the shaft is rotated. When power failure occurs, or when shaft 20 is turned faster than the power assisting motor can turn the wheels, slide valve 50 will be moved to its wide open position and thrust bearing 84 will abut the bottom of recess 92 to prevent further axial movement. When rotation of shaft 20 is stopped, rotation of shaft 10 catches up, permitting inlet pressure and spring 100 to return the shaft to its neutral position. Clockwise rotation of shaft 20 produces similar but opposite movements which will be readily apparent from the drawings, and for that reason will not further be described.

Chatter or flutter is eliminated in the device shown in the drawing by means of damping means B Axial valve shifting movement of the shaft 20 causes the movable wall or piston 69 of the damping means B to force liquid out of one opposing chamber and into the other. The flow restricting orifices in the branch portions 112 and 114 of the passageway 110 slows down the transfer of liquid from one opposing chamber to the other and provides a stabilizing influence to the shaft 20. Cavitation is prevented in the device shown in the drawing by supplying inlet pressure to the opposing chambers 78 and 80 such that positive pressure is assured in the expanding opposed chamber even during rapid shifting of the shaft 20.

While the principles of the present invention have been described as embodied in a power steering system utilizing axial movement of the steering shaft for actuating a slide valve, it is not intended to be limited thereto. It will be apparent that rotary type valves and fluid pressure motors can be operatively connected to control steering systems, and that flow restricting passageways similar to those of the preferred embodiment can be provided for such rotary types of fluid pressure motors.

From the foregoing description of the preferred embodiment of the invention, it will be apparent that the objects heretofore enumerated as well as others have been accomplished. While the preferred embodiment of the invention has been shown and described in detail, the invention is not limited to the particular construction shown and it is my intention to cover hereby all adaptations, modifications and uses thereof which come within the practice of those skilled in the art to which the invention relates and within the scope of the appended claims.

I claim:

1. In a power steering mechanism, a housing; a rotatable shaft in said housing having gearing thereon; gear means in mesh with said gearing on said shaft; said shaft being supported in a manner permitting a perdeterminded amount of axial movement with respect to said housing; a slide valve comprising a valve body and a slide having a neutral position, one end position in which increased fluid pressure is supplied to a first valve port, and an opposite end position in which increased fluid pressure is supplied to a second valve port; said slide valve being operatively connected to said housing and said shaft in such manner as to transmit relative axial movement between said shaft and said housing to said slide and valve body; damping means having a body provided with a pair of opposed chambers separated by a movable wall, said damping means being operatively connected to said housing and said shaft in such manner as to transmit the relative axial movement between said shaft and said housing to the body and movable wall of said damping means; and fluid flow restricting means communicating said opposed chambers of said damping means whereby said relative movements are restrained by fluid displacement between said opposed chambers.

2. In a power steering mechanism, a housing; a rotatable shaft in said housing having gearing thereon; gear means in mesh with said gearing on said shaft; said shaft being supported in a manner permitting a predetermined amount of axial movement with respect to said housing; a slide valve comprising a valve body and a slide having a neutral position, one end position in which increased fluid pressure is supplied to a first valve port, and an opposite end position in which increased fluid pressure is supplied to a second valve port; said slide valve being operatively connected to said housing and said shaft in such manner as to transmit relative axial movement between said shaft and said housing to said slide and valve body; damping means having a body provided with a pair of opposed chambers separated by a movable wall, said damping means being operatively connected to said housing and said shaft in such manner as to transmit the relative axial movement between said shaft and said housing to the body and movable wall of the damping means; and fluid flow conducting means in constant communication with a supply of fluid pressure, said conducting means including a first branch connection in communication with one of said opposed chambers and having flow restricting means therein, and said conducting means also including a second branch connection in communication with the other of said opposed chambers and having flow restricting means therein; whereby both of said opposed chambers are maintained under pressure to prevent cavitation, and relative movement of said valve portions is restrained by the restricted flow through said branch connections.

3. In a power steering mechanism and the like, a housing; a shaft rotatably journalled in said housing in a manner permitting axial movement; a slide valve in said housing surrounding said shaft and having a slide carried by and movable axially with said shaft between opposite end positions for regulating pressure between an inlet, outlet, and first and second motor connections, said slide valve having porting by which increased pressure is supplied to the first motor connection when said slide is in one end position, and to the second motor connection when in the opposite end position; means biasing said slide and shaft to a neutral position intermediate said end positions; an enclosed annular chamber in said housing about said shaft; a movable wall in said chamber dividing said chamber into opposed chambers, said movable wall being carried by said shaft; said housing having a fluid conducting passageway in communication with said inlet connection, a first branch connection communicating said passageway with one of said opposed chambers and having a flow restricting orifice therein, and a second branch connection communicating said passageway with the other of said opposed chambers and having a flow restricting orifice therein; whereby valve chatter is greatly reduced by fluid flow through said restricting orifices, and cavitation in the opposed chambers is counteracted by the pressure supplied from said inlet connection.

4. In a power steering system and the like, a driven member, a manually movable control member for said system, mechanism comprising one or more members for transmitting movement of said control member to said driven member, said mechanism being constructed and arranged to move said driven member between first and second positions as the control member is moved between first and second positions and providing a generally predetermined amount of lost motion in its transmitting of said movement from said control member to said driven member, a fluid pressure motor for also driving said driven member and having a first pressure inlet port for moving said driven member to its first position and a second pressure inlet port for moving said driven member to its second position, a control valve having first and second portions which are moved relative to each other during the above stated generally predetermined amount of lost motion between a first position adapted to conduct an inlet pressure to said first motor port, and a second position adapted to conduct said inlet pressure to said second motor port; damping means having a housing connecting with one of said portions of said control valve and having a fluid chamber therein; and a movable wall in said chamber of said housing and connecting with the other of said portions, said movable wall dividing said chamber into opposed chambers; said system having fluid conducting means providing restricted fluid flow communication between said opposed chambers.

5. In a power steering system and the like, a driven member, a manually movable control member for said system, mechanism comprising one or more members for transmitting movement of said control member to said driven member, said mechanism being constructed and arranged to move said driven member between first and second positions as the control member is moved between first and second positions and providing a generally predetermined amount of lost motion in its transmitting of said movement from said control member to said driven member, a fluid pressure motor for also driving said driven member and having a first pressure inlet port for moving said driven member to its first position and a second pressure inlet port for moving said driven member to its second position, a control valve having first and second portions which are moved relative to each other during the above stated generally predetermined amount of lost motion between a first position adapted to conduct an inlet pressure to said first motor port, and a second position adapted to conduct said inlet pressure to said second motor port; damping means having a housing connecting with one of said portions of said control valve and having a fluid chamber therein; a movable wall in said chamber of said housing and connecting with the other of said portions, said movable wall dividing said chamber into opposed chambers; said system having fluid conducting means including a first branch connection in communication with one of said opposed chambers and having flow restricting means therein, and said conducting means also including a second branch connection in communication with the other of said opposed chambers and having flow restricting means therein; whereby relative movement of said valve portions is restrained by the restricted flow through said branch connections.

6. In a power steering system and the like, a turnable shaft for changing the position of the axis of rotation of a wheel, a manually movable control member for said system, mechanism comprising one or more members for transmitting movement of said control member to said turnable shaft, said mechanism being constructed and arranged to move said turnable shaft between first and second positions as the control member is moved between first and second positions and providing a generally predetermined amount of lost motion in its transmitting of said movement from said control member to said turnable shaft, a fluid pressure motor for also driving said turnable shaft and having a first pressure inlet port for moving said turnable shaft to its first position and a second pressure inlet port for moving said turnable shaft to its second position, a control valve having first and second portions which are moved relative to each other during the above stated generally predetermined amount of lost motion between a first position adapted to conduct an inlet pressure to said first motor port, and a second position adapted to conduct said inlet pressure to said second motor port; damping means having a housing connecting with one of said portions of said control valve and having a fluid chamber therein; a movable wall in said chamber of said housing and connecting with the other of said portions, said movable wall dividing said chamber into opposed chambers; said system having fluid conducting means communicating with said inlet pressure, said conducting means including a first branch connection in communication with one of said opposed chambers and having flow restricting means therein, and said conducting means also including a second branch connection in communication with the other of said opposed chambers and having flow restricting means therein; whereby both of said opposed chambers are maintained under pressure to prevent cavitation, and relative movement of said valve portions is restrained by the restricted flow through said branch connections.

No references cited.